United States Patent [19]

Karasaki et al.

[11] Patent Number: 4,696,558
[45] Date of Patent: Sep. 29, 1987

[54] FOCUS CONDITION DETECTING ARRANGEMENT

[75] Inventors: Toshihiko Karasaki; Toru Matsui, both of Sakai; Hiroshi Ueda, Habikino, all of Japan

[73] Assignee: Minolta Camera Kabushiki Kaisha, Osaka, Japan

[21] Appl. No.: 916,620

[22] Filed: Oct. 8, 1986

[30] Foreign Application Priority Data

Oct. 11, 1985 [JP]  Japan ................................ 60-227092

[51] Int. Cl.⁴ ............................................. G03B 3/00
[52] U.S. Cl. .................................................... 354/406
[58] Field of Search ............................... 354/402–409; 250/201 R, 201 P, 201 F, 204

[56] References Cited

U.S. PATENT DOCUMENTS 4,473,287  9/1984  Fukuhara et al. .................... 354/409
4,602,861  7/1986  Taniguchi et al. ................... 354/403

FOREIGN PATENT DOCUMENTS

55-111929  8/1980  Japan .
57-154224  9/1982  Japan .
57-150808  9/1982  Japan .
58-59413   4/1983  Japan .

Primary Examiner—W. B. Perkey
Attorney, Agent, or Firm—Price, Gess & Ubell

[57] ABSTRACT

In a focus condition detecting arrangement for use in a photographic camera, a focus condition detecting device including photo-sensor arrays having sensitivity with respect to a visible light and an infrared light from a target object to be photographed produces a focus condition detection signal based on an output of the photo-sensor arrays. A contrast detecting device which detects the visible light and the infrared light from the target object for detecting contrasts of the target object with respect to the respective lights, and a correcting means corrects the focus condition detection signal based on the output of the contrast detecting device, so that a corrected focus condition detection signal of the target object with respect to the visible light region is obtained.

5 Claims, 15 Drawing Figures

FOCUS CONDITION DETECTING ARRANGEMENT

BACKGROUND OF THE INVENTION

The present invention generally relates to an automatic focus control system for a photographic camera, and more particularly, to a focus condition detecting arrangement for use in an automatic focus control system.

Conventionally, there has been proposed, for example, in Japanese Patent Laid-open Application Tokkaisho No. 58-59413, a focus condition detecting device which is so arranged as to generate a focus condition detection signal indicative of amount and direction of deviation of an image of a target object from a predetermined focal plane based on output signals of AF (automatic focusing) photo-sensor arrays which detect an infrared light and a visible light from the target object as a mixed light. For compensation for the amount of deviation between an in-focus position by the infrared light and that by the visible light, the focus condition detection signal is corrected by the ratio in light amount of the visible light to the infrared light contained in the mixed light.

The known arrangement as described above, however, has such a disadvantage that the focus condition detection signal tends to be over-corrected with respect to a target object which has a high contrast, but is dark in the visible light region, or a target object having a low contrast, but bright in the infrared light region.

SUMMARY OF THE INVENTION

Accordingly, an essential object of the present invention is to provide a focus condition detecting arrangement for use in a photographic camera, which is capable of accurately effecting correction of the focus condition detection signal even with respect to a target object in which the light amount ratio and contrast ratio of the visible light to the infrared light of the target object are not equal to each other.

In accomplishing the above object, attention has been directed to the fact that the focus condition detecting signal obtained by the focus detection based on the mixed light may be accurately corrected not by the light amount ratio of the visible light to the infrared light, but by contrasts of a target object with respect to the visible light and the infrared light. Thus, according to the present invention, there are provided contrast detecting means for detecting contrasts of the target object with respect to the respective lights, and a correcting means for correcting a focus condition detection signal generated by a focus condition detecting device based on an output of the contrast detecting means, so that a corrected focus condition detection signal representing the focus condition with respect to the visible light is obtained. The focus condition detecting device includes photo-sensor means having sensitivity with respect to the visible light and the infrared light and produces the focus condition detection signal based on an output of the photo-sensor means.

The focus condition detecting arrangement of the present invention having the construction as described above is applied, for example, to the active automatic focusing system adapted to project infrared light toward the target object to be photographed.

BRIEF DESCRIPTION OF THE DRAWINGS

These and other objects and features of the present invention will become apparent from the following description taken in conjunction with the preferred embodiment thereof with reference to the accompanying drawings, in which:

FIG. 4($a$) is a graph showing an output from a photo-sensor array upon use of the above specific chart as a model;

FIG. 4($b$) is a graph showing variations of a focus condition deviation $\Delta Z_R$ in an infrared light region;

FIG. 5($a$) is a graph showing an output of the photo-sensor array only for the visible light;

FIG. 5($b$) is a graph showing an output of the photo-sensor array only for the infrared light;

FIG. 5($c$) is a graph showing the result of the superposition of the above two outputs of the photo-sensor array;

FIG. 17 is a flow-chart specifically showing contents of steps #10 and #11 in FIG. 11.

DETAILED DESCRIPTION OF THE INVENTION

Before the description of the present invention proceeds, it is to be noted that like parts are designated by like reference numerals throughout the accompanying drawings.

Figure 2:
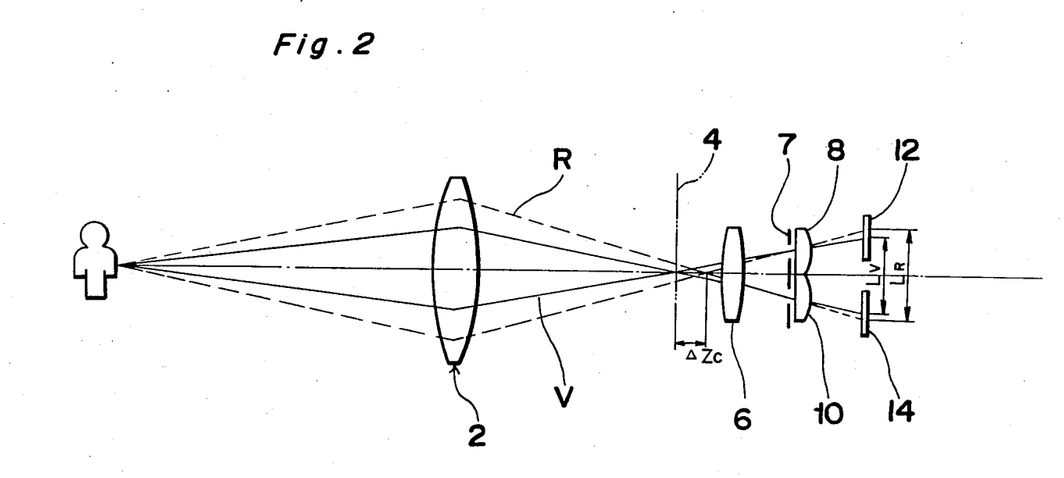
FIG. 2 is a block diagram for explaining a fundamental structure of a focus condition detecting optical system which may be applied to the present invention.

Referring now to the drawings, there is shown in FIG. 2, an optical system of a focus condition detecting arrangement for a photographic camera, to which the present invention may be applied. The optical system generally includes a condenser lens 6 disposed at a predetermined focal plane 4 behind an objective lens 2 or at a position behind the focal plane 4, re-image forming lenses 8 and 10 provided with a diaphragm mask 7 and disposed further behind the condenser lens 6, and AF photo-sensor arrays 12 and 14 having, e.g. CCD (charge coupled device) as light receiving elements and provided at image forming planes of the re-image lenses 8 and 10. It should be noted that the plane 4 is predetermined with respect to the visible light.

In the case where sensors having sensitivity both for the infrared light R and visible light V are employed for the AF photo-sensor arrays 12 and 14, an image interval $L_R$ corresponding to the infrared light R becomes generally larger than an image interval $L_V$ corresponding to the visible light V. Meanwhile, the relation of a difference $\Delta X_C (=L_R-L_V)$ between the image intervals $L_R$ and $L_V$, and a deviation $\Delta Z_C$ of the focus position of the infrared light R on an optical axis from the predetermined focal plane 4 may be generally determined for the focus condition detecting optical system of this kind so as to be in a proportional relation with one another.

Subsequently, the influence of the infrared light will be described with respect to a focus condition detecting arrangement of a phase difference detecting type, but substantially, such description may similarly apply to a focus condition detecting arrangement of a contrast detecting type.

Figure 1:
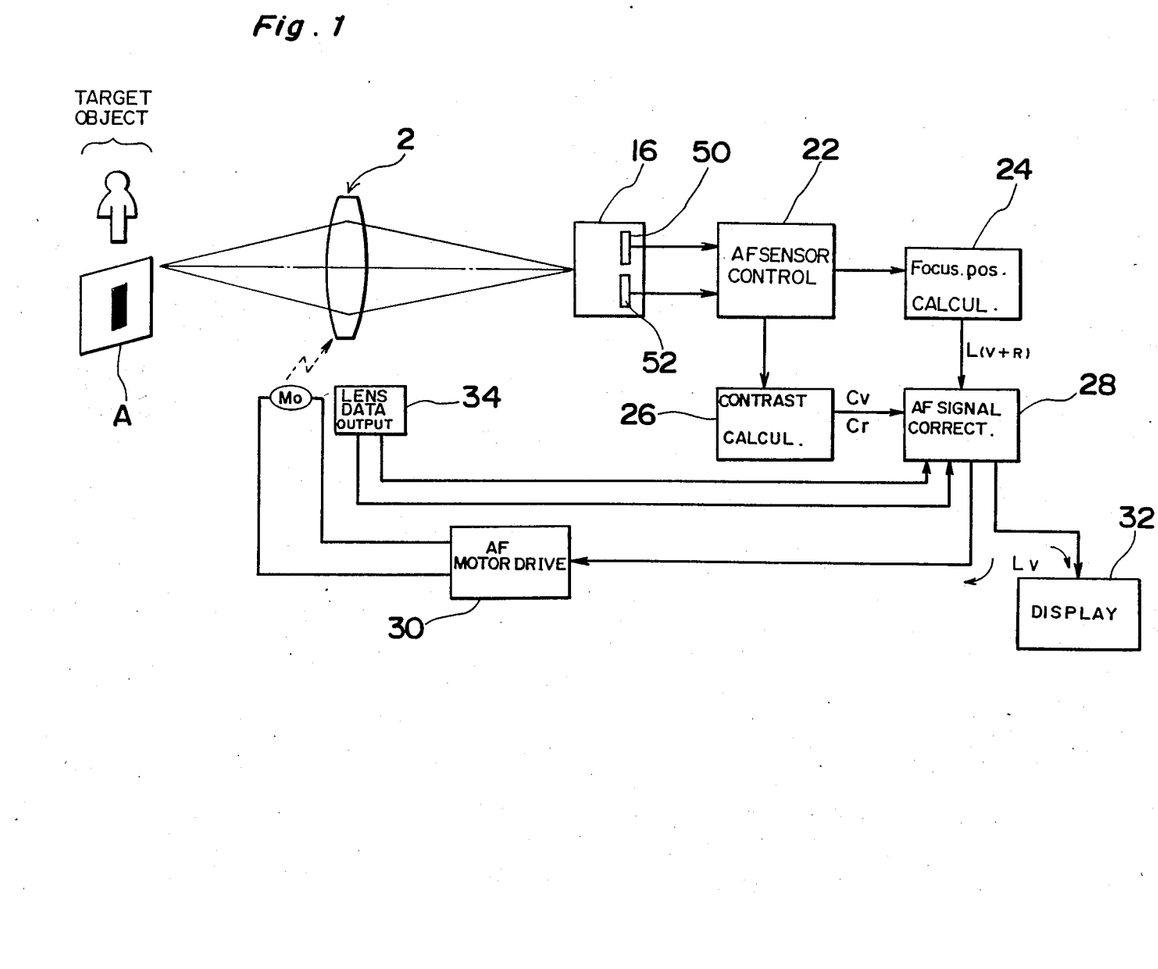
FIG. 1 is a block diagram for explaining a system construction of a focus condition detecting arrangement according to the present invention.

Referring also to FIG. 1, there is shown a block diagram illustrating a basic system construction according to one preferred embodiment of the present invention.

In FIG. 1, a sensor module 16 corresponding to the portions 6, 7, 8, 10, 12 and 14 in FIG. 2, and described in more detail later with reference to FIGS. 8 and 9), include a photo-sensor array 50 for simultaneously detecting an infrared light and an visible light from a target object to be photographed as a mixed light, and another photo-sensor array 52 for separately detecting only the visible light and only the infrared light from the same target object. The output of the photo-sensor array 50 is applied to an AF sensor control portion 22, and after being subjected to an A/D conversion, is transmitted to a focus condition calculating portion 24 so as to be converted thereat into an image interval signal $L_{(V+R)}$ by a predetermined algorithm. Meanwhile, the output of the photo-sensor array 52 for separately detecting only the visible light and only the infrared light is also led to the AF sensor control portion 22, and after being subjected to the A/D conversion thereat, further transmitted to a contrast calculating portion 26. The contrast calculating portion 26 is adapted to calculate the contrast value $C_v$ with respect to only the visible light and contrast value $C_r$ with respect to only the infrared light, from the output of the photo-sensor array 52, and applies the contrast values $C_v$ and $C_r$ thus obtained to an AF signal correcting portion 28 coupled to a lens data output portion 34 which produces a chromatic aberration information $\Delta X_r$ on the optical axis of the objective lens 2. As described in detail hereinbelow, the AF signal correcting portion 28 produces a correction signal $\Delta X_C$ based on the contrast values $C_v$ and $C_r$ transmitted from the contrast calculating portion 26 and the chromatic aberration information $\Delta X_r$ transmitted from the lens data output portion 24 and then subtracts the correction signal $\Delta X_C$ from the image interval signal $L_{(V+R)}$ transmitted from the focus condition calculating portion 24 to finally produce a corrected image interval signal $L_v$. An AF motor driving section 30 is driven and controlled by this corrected image interval signal $L_v$ and the corresponding data is displayed at a display portion 32.

Figure 3:
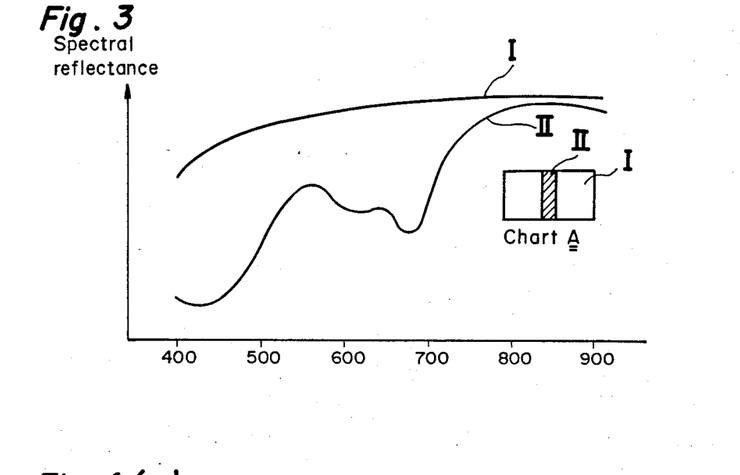
FIG. 3 is a graph showing spectral reflectance at each portion when a specific chart is employed.

FIG. 3 shows data for spectral reflectance in the case where a chart A having one green slit on a white background is selected as an object as also exemplified in FIG. 1. As is seen from FIG. 3, when the wavelength region exceeds 700 nm, the spectral reflectance II for the green slit rapidly increases, and upon exceeding 800 nm, there is almost no difference between the spectral reflectance I for the white background and the spectral reflectance II for the green slit, resulting in a reduction in the contrast difference.

Figure 4A:
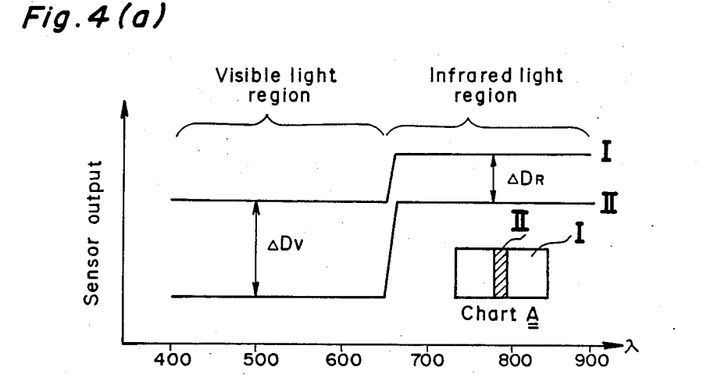

In FIG. 4(a), the spectral reflectance characteristics of FIG. 3 are represented in a model form for facilitation of subsequent analysis, and there are respectively shown the outputs of the photo-sensor arrays for the visible light and infrared light corresponding to the white background portion (I), and the outputs of the photo-sensor arrays for the visible light and infrared light corresponding to the green slit portion (II). In the above model representation, although the respective outputs of the photo-sensor array for the visible light corresponding to the white background portion I and the green slit portion II are small in the values, the difference $\Delta D_v$ (contrast) between the outputs tends to be large. On the contrary, the respective outputs of the photo-sensor array for the infrared light corresponding to the portions I and II are large in the values, but the difference $\Delta D_R$ (contrast) therebetween is generally small. Meanwhile, it is regarded that there is no particular wavelength dependency in the outputs of the photo-sensor array with respect to the visible light region and infrared light region.

Figure 4B:
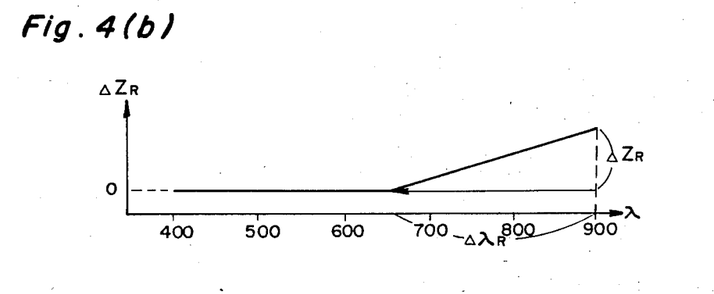

FIG. 4(b) is a graph showing deviation in the focus position due to the chromatic aberration of the objective lens 2. In the graph, it is regarded that the chromatic aberration does not cause any deviation of the focus position in the wavelength region below 650 nm, while in the wavelength region above 650 nm, it causes a deviation varying in a straight line. The deviation amount $\Delta Z_R$ in the predetermined infrared light region $\Delta \lambda_R$ to be utilized for the automatic focusing is determined by individual objective lenses, and the information therefor may be obtained from the lens data output section 34 of the objective lens 2 as shown in FIG. 1.

Figure 5A:
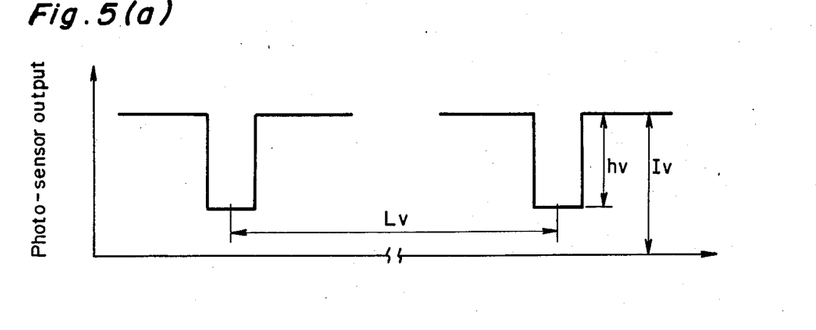

In FIG. 5(a), there is shown the image of the chart A on a photo-sensor array formed by the lights in the visible light region. The image is clear and definite owing to the absence of influence by the chromatic aberration, and the interval $L_V$ of the images corresponds to the real focus condition with respect to the visual light.

Figure 5B:
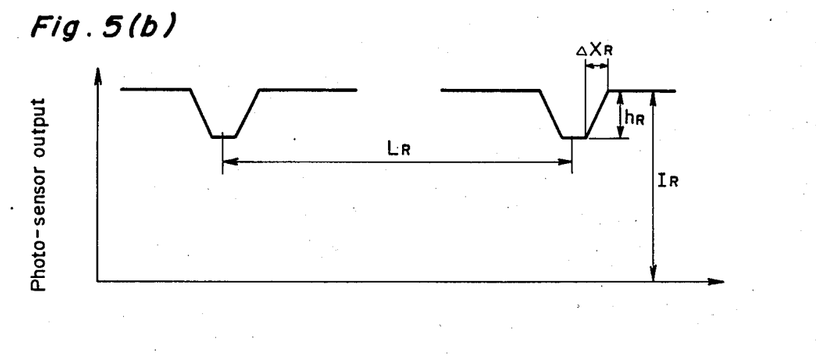

Meanwhile, FIG. 5(b) is a graph showing the target object images on the photo-sensor array formed by the lights in the infrared light region. Due to the influence by the chromatic abberation varying with the wavelengths, the images bleed, and the image interval $L_R$ becomes larger than $L_V$ as described earlier.

Figure 5C:
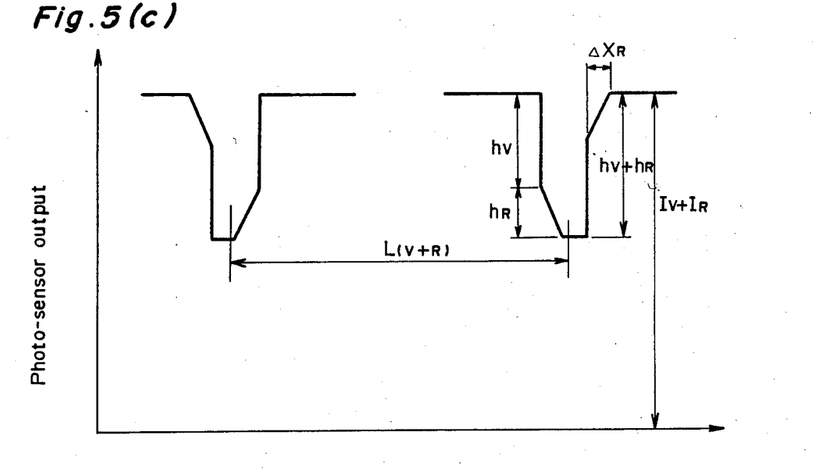

FIG. 5(c) is a graph showing the target object images of chart A formed by the mixed light of the visible light and infrared light. The graph of FIG. 5(c) is a combination of the graphs of FIGS. 5(a) and 5(b). The image configurations of the target object images at the right and left are different from each other, with the interval $L_{V+R}$ of the image taking a value intermediate between $L_R$ and $L_V$.

Figure 6:
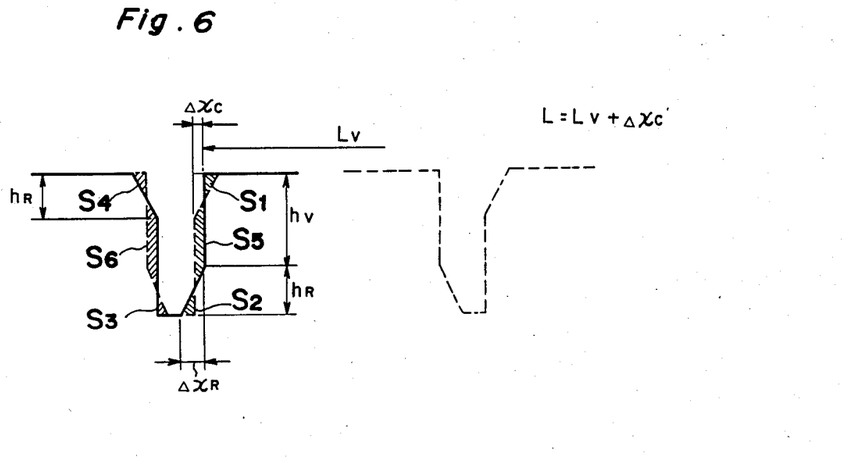
FIG. 6 is a diagram explanatory of a calculating system for the correcting amount.

FIG. 6 shows how the target object images at the right and left in FIG. 5(c) correspond to one another. When $L_{(V+R)}$ represented as $L_V+\Delta X_C$, the $\Delta X_C$ becomes the correction amount, which is a minimum value of the degree of disagreement between the image at the right (indicated by solid lines in FIG. 6) and the image at the left (indicated by dotted lines in FIG. 6). The degree of disagreement is represented by an equation $S=S_1+S_2+\ldots+S_6$ wherein $S_1, S_2, \ldots S_6$ represent parts of the disagreement between the two images as indicated in FIG. 6.

The degree of disagreement S may be specifically calculated based on the geometrical relation as shown in FIG. 6.

$$S = \tfrac{1}{3}(\Delta X_R - \Delta X_C)h_R' \times 4 + \Delta X_C(h_V - h_R')2$$

where $h_R' = (\Delta X_R - \alpha X_C)h_R / \alpha X_R$

Upon consideration that the degree of disagreement S is a secondary function of $\Delta X_C$, the value of $\Delta X_C$ when the value S becomes the minimum will be represented by $\Delta X_R(3 - h_V/h_R)/4$. The above conditions may be simplified by a ranking classification, for example, as follows.

When the relation is $h_V/h_R \geq 3$, $\Delta X_C = 0$ (without infrared light correction).

In the relation $\tfrac{1}{3} < h_V/h_R < 3$, $\Delta X_C = \Delta X_R(3 - h_V/h_R)/4$.

In the relation $h_V/h_R \leq \tfrac{1}{3}$, $\alpha X_C = \Delta X_R$ (perfect infrared light correction).

It is to be noted here that $\Delta X_R$ referred to above represents the difference of the image interval $L_R$ for the infrared light at the specific infrared light region $\Delta \lambda_R$ and the image interval $L_V$ for the visible light. It is to be noted that one example for establishing such relations as $\Delta X_C = \Delta X_R$ may be represented by the case where the focus detection is effected by projecting infrared light onto a target object to be photographed.

Figure 7:
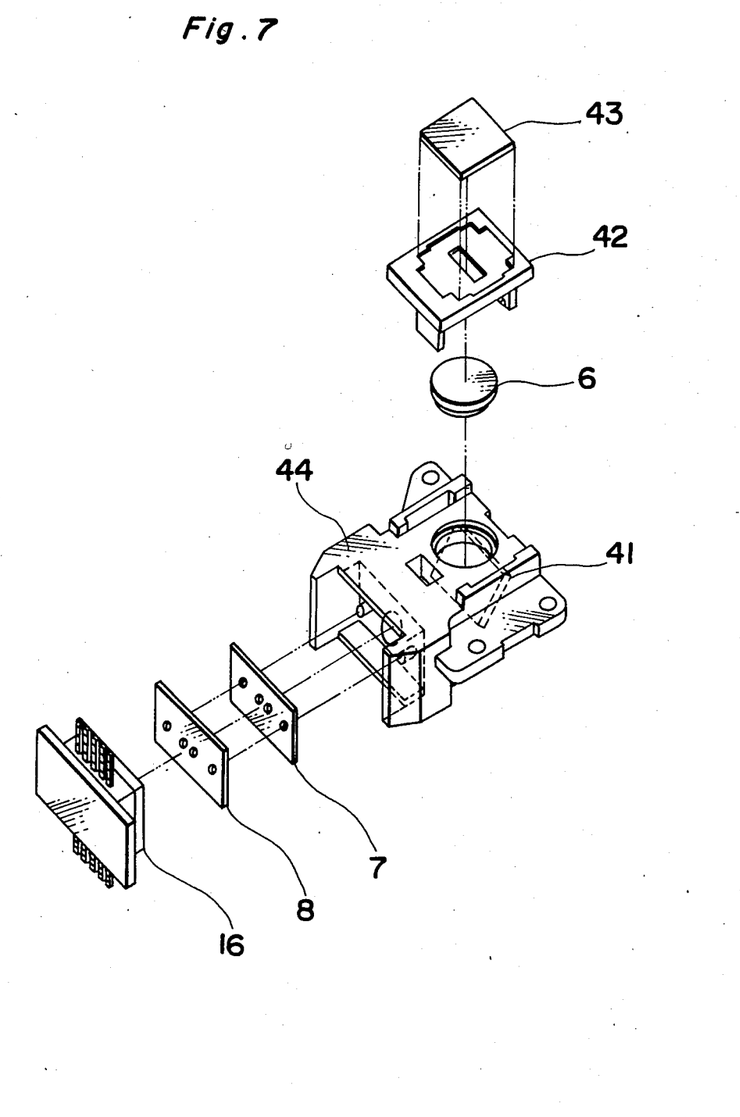
FIG. 7 is an exploded perspective view of a sensor module.

Referring further to FIG. 7, there is shown one example of an AF sensor module which may be applied to the present invention. This AF sensor module includes a lens holder 44 having a light path changing mirror 41 incorporated therein, a condenser lens 6, a visual field mask 42 and an infrared light cut-off filter 43 which are supported on the lens holder 44 in positions above the mirror 41, and a diaphragm mask 7, a transparent plate 8 formed with a pair of re-image forming lenses and a photo-sensor device 16 incorporated with photo-sensor arrays which are all arranged in a direction perpendicular to the optical path altered by the light path changing mirror 41 as disclosed, for example, in U.S. Pat. No. 4,526,458. The infrared light cut-off filter 43 is designed to cut off infrared lights having wavelength longer than 900 nm for the purpose of minimizing the influence of the chromatic aberration. Another purpose of the infrared light cut-off filter 43 is to prevent deterioration of reliability of the focus condition detection signal caused by difference in light sensitivities of the respective picture elements of the photo-sensor arrays with respect to a light having a long wavelength. Meanwhile, such a difference in light sensitivities is inherent in a semiconductor photo-sensor device such as CCD (charge coupled device).

Figure 8:
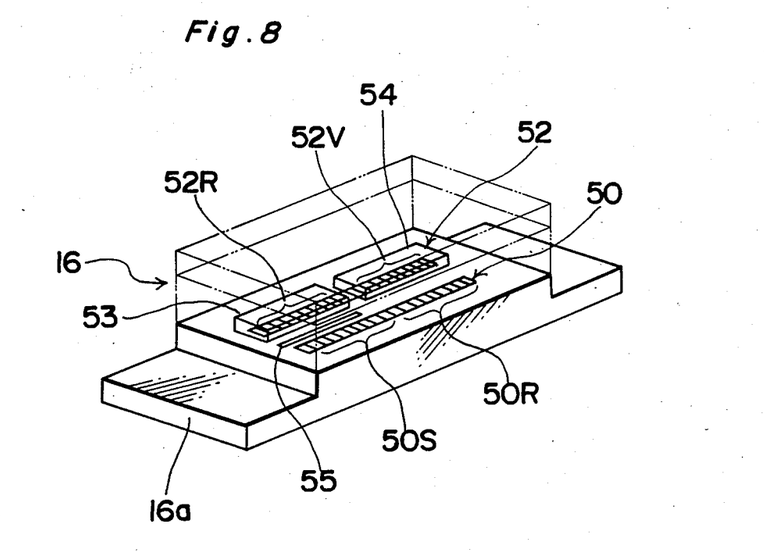
FIG. 8 is a perspective view showing a state of arrangement of a photo-sensor device CCD provided in the sensor module.

Referring further to FIG. 8, there is shown the construction of the photo-sensor device 16 employed in the AF sensor module of FIG. 7.

The photo-sensor device 16 includes the two photo-sensor arrays 50 and 52 provided on a base 16a in a relation parallel to each other. One photo-sensor array 50 has spectral sensitivities with respect to visible light and infrared light, and the images of the target object are formed on the standard portio 50S and the reference portion 50R by the two re-image forming lenses as described earlier. The other photo-sensor array 52 has an area 52R sensitive only to infrared light and another area 52V sensitive only to visible light. Thus, the spectral sensitivity of the areas 52R and 52V is sectioned at a wavelength in the vicinity of approximately 650 nm and the areas 52R and 52V aiming at the same target object to be photographed through the two re-image forming lenses. For providing the areas 52R and 52V, with such spectral sensitivities, a visible light cut-off filter 53 is attached to the infrared light area 52R, while an infrared light cut-off filter 54 is applied onto the visible light area 52V. Instead of employing these filters 53 and 54, it is possible to locally alter the spectral sensitivity characteristics of the photo-sensor array 52 itself. The standard portion 50S and the infrared light area 52R, and the reference portion 50R and the visible light area 52V are respectively located very close to each other, so that they can aim at approximately the same target object. There is provided a monitoring photo diode 55 closely in a space between the infrared light area 52R and the standard portion 50S (or between the visible light area 52V and the reference portion 50R). In the case where the photo-sensor arrays 50 and 52 are of a charge integration type, for example, as in CCD, the charge integration time period in the photo-sensor arrays 50 and 52 is controlled according to the brightness of the target object to be photographed as detected by the monitoring photo diode array 55. It is to be noted that the spectral sensitivity of the monitoring photo diode 55 extends over the visible light and the infrared light.

Figure 9:
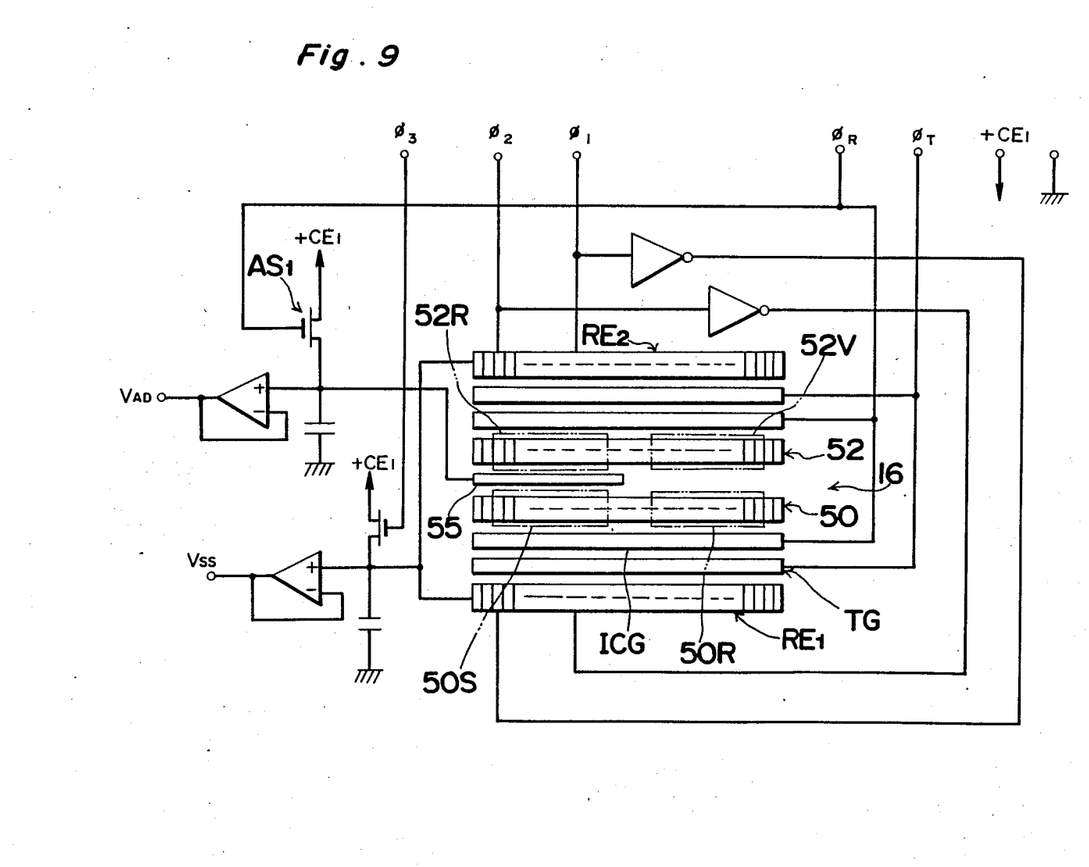
FIG. 9 is a diagram showing a circuit construction of the photo-sensor device CCD.
Figure 10:
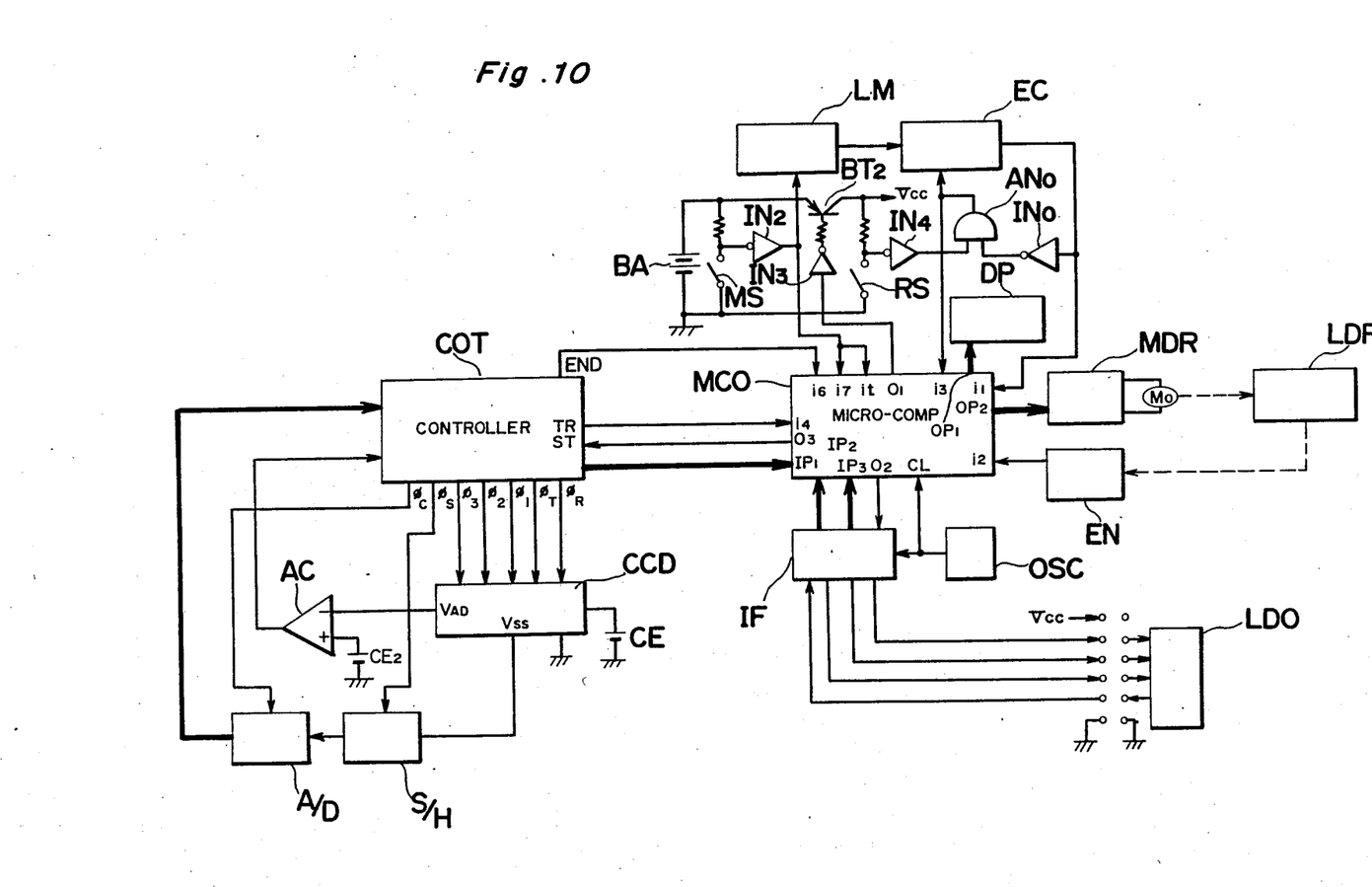
FIG. 10 is an electrical circuit diagram showing an overall circuit construction of the focus condition detecting arrangement according to one preferred embodiment of the present invention.

Reference is further made to FIG. 9 showing the circuit construction of the photo-sensor device 16 (CCD) in FIG. 8, and also to FIG. 10 illustrating one example of the circuit construction for driving the photo-sensor device and processing outputs therefrom. As described earlier, the photo-sensor array 50 has the standard portion 50S and the reference portion 50R, while the other photo-sensor array 52 includes the infrared light area 52R and the visible light areas 52V as shown in FIG. 9. It should be noted here that the number of picture elements constituting the photo-sensor arrays 50 and 52 need not necessarily be the same, but it is possible to decrease one of the numbers, for example, by roughening the pitch of the picture elements for the photosensor array 52 for the purpose of shortening the time period required for serial output of the individual picture element output signals. However, even in such a case, it is necessary that the numbers of the picture elements for the infrared light area and the visible light area of the photo-sensor array 52 become equal to each other. The output signals of the photo-sensor arrays 50 and 52 are produced from a common output terminal Vss through shift resistors $RE_1$ and $RE_2$ connected therewith as shown. In FIG. 10, a CCD equivalent as the photo-sensor device 16 in FIG. 9 is connected to a controller COT for effecting timing control of the light measurement for the focus condition detection, etc., and also to an S/H circuit for sample-holding analog output signals from the CCD, while the S/H circuit is further coupled with the controller COT through an A/D conversion circuit for A/D conversion of the output of the sample-hold circuit S/H. The controller COT is coupled with a micro-computer MCO, to which a light measurement circuit LM, an exposure control circuit EC, a display circuit DP, a motor driving circuit MDR, an encoder EN for monitoring the driving amount of a lens driving mechanism LDR. a circuit OSC, and an interface circuit IF for receiving data necessary for lens driving from the lens data output circuit LDO (equivalent to the portion 34 in FIG. 1) are connected as shown at corresponding terminals.

When a pulse for instructing start of light measurement for the focus condition detection is transmitted from an output terminal $O_3$ of the micro-computer MCO to a terminal ST of the controller COT, the controller COT produces a reset pulse from its terminal $\phi R$ for rendering an analog switch $AS_1$ (FIG. 9) conductive and closing an integration clear gate ICG, so that the monitoring photo diode 55 and all the picture elements constituting the photo-sensor arrays 50 and 52 are electrically charged up to the output potential of a constant voltage source $CE_1$ connected to the CCD. Immediately thereafter, all the picture elements of the photo-sensor arrays 50 and 52 as well as the monitoring diode 55 start accumulation of electrical charge produced by the light receiving portions thereof (individual photo-electric converting elements), and the CCD produces an output potential corresponding to the electrical charge accumulated in the monitoring diode 55 from its terminal $V_{AD}$, with the output potential being led to a negative terminal of a comparator AC whose output is connected to the controller COT. The comparator AC compares the potential corresponding to the accumulated charge applied from the terminal $V_{AD}$ with an output potential of a constant voltage source $CE_2$ connected to its positive terminal, and upon coincidence thereof, sends "High" signal to the controller COT. Then, the controller COT produces, from its terminal $\phi_T$, a shift pulse which transfers the electrical charges accumulated in the individual picture elements of the photo-sensor arrays 50 and 52 to a shift gate TG (FIG. 9). Thereafter, from the output terminal Vss of the CCD, based on the transfer clock pulses $\phi_1$, $\phi_2$ and $\phi_3$, the accumulated charges are successively fed to the sample-hold circuit S/H.

The controller COT produces the sample-hold pulses from its terminal $\phi_S$, and subsequently, produces the A/D conversion starting pulses from its terminal $\phi_C$. Then, the converter A/D subjects the output of the sample-hold circuit S/H to the A/D conversion. Thereafter, the controller COT produces a pulse noticing data transfer from its terminal TR to an input terminal $i_4$ of the micro-computer MCO, and also applies data subjected to the A/D conversion by the A/D converter, to an input port $IP_1$ of the micro-computer MCO. Subsequently, the functions for the sample-holding, A/D conversion and data transfer as described above are repeated, and upon completion of the data transfer equal in number to the number of the picture elements of the photo-sensor arrays 50 and 52 of the CCD, the controller COT feeds a data transfer completion pulse from its terminal END to an input terminal $i_6$ of the micro-computer MCO to stop the functioning.

The circuit of FIG. 10 further includes a power source battery BA connected between the emitter of a transistor $BT_2$ and the ground, a switch MS to be closed at a first stage upon depression of a shutter release button (not shown) and connected in parallel with the battery BA, an inverter $IN_2$ inserted between the fixed terminal of the switch MS and a line connecting the light measurement circuit LM with terminals $i_7$ and $i_t$ of the micro-computer MCO, an inverter $IN_3$ inserted in a line connecting the base of the transistor $BT_2$ with the terminal $O_1$ of the micro-computer MCO, another switch RS to be closed at a second stage upon depression of the shutter release button and inserted between the collector of the transistor $BT_2$ and the ground, an inverter $IN_4$, an AND circuit $AN_0$, and another inverter $IN_0$ inserted between the fixed terminal of the switch RS and a line connecting the exposure control circuit EC with the micro-computer MCO.

In the above arrangement, upon closure of the switch MS, the output of the inverter $IN_2$ becomes "High" and the micro-computer MCO starts the focus condition detection and focus adjusting operation, while the light measurement circuit LM also starts operation. Meanwhile, in response to the closure of the switch MS, the micro-computer MCO renders its terminal $O_1$ to be "High" and thus the output of the inverter $IN_3$ to be "Low" so as to conduct the transistor $BT_2$ for power supply from a power source line Vcc. When the switch RS is closed, the output of the inverter $IN_4$ becomes "High". In this case, if the exposure control circuit EC is in a ready condition to make the output of the inverter $IN_0$ being "High", the output of the AND circuit $AN_0$ becomes "High", and the micro-computer MCO stops the focus condition detection and the focus adjusting operation and waits for termination of the exposure control operation. Upon closure of the switch RS, the exposure control circuit EC effects the exposure control operation based on the exposure control signal from the light measurement circuit LM, and when the exposure control is completed, applies an operation completion signal in "High" state to the input terminal $i_1$ of the micro-computer MCO. This signal becomes "Low" when an exposure control mechanism (not shown) has been cocked so as to be ready for exposure control.

A display device DP makes display for the front-focus, rear-focus and in-focus based on a signal from the output port $OP_1$ of the micro-computer MCO. A motor driving circuit MDR causes the motor MO to rotate in a forward direction or reverse direction based on a signal from the output port $OP_2$ of the micro-computer MCO, so that the motor MO drives an objective lens (not shown) to the in-focus position through a lens driving mechanism LDR. An encoder EN connected to the micro-computer MCO at the terminal $i_2$ monitors the amount of drive of the lens driving mechanism LDR and produces one pulse each time the lens driving mechanism LDR is driven by a predetermined amount. An interface circuit IF receives a signal representing the data required for the focus adjusting operation from a lens data output circuit LDO (corresponding to the portion 34 in FIG. 1) in response to a pulse from the output terminal $O_2$ of the micro-computer MCO. The data represented by the signal from the data output circuit LDO are the data $\Delta X_R$ representing the deviation amount between the in-focus position for the infrared light and the in-focus position for the visible light, and data K representing a ratio of the amount of drive of the objective lens to a predetermined amount of drive (i.e., predetermined number of pulses from the encoder EN) of the lens driving mechanism LDR.

Figure 11:
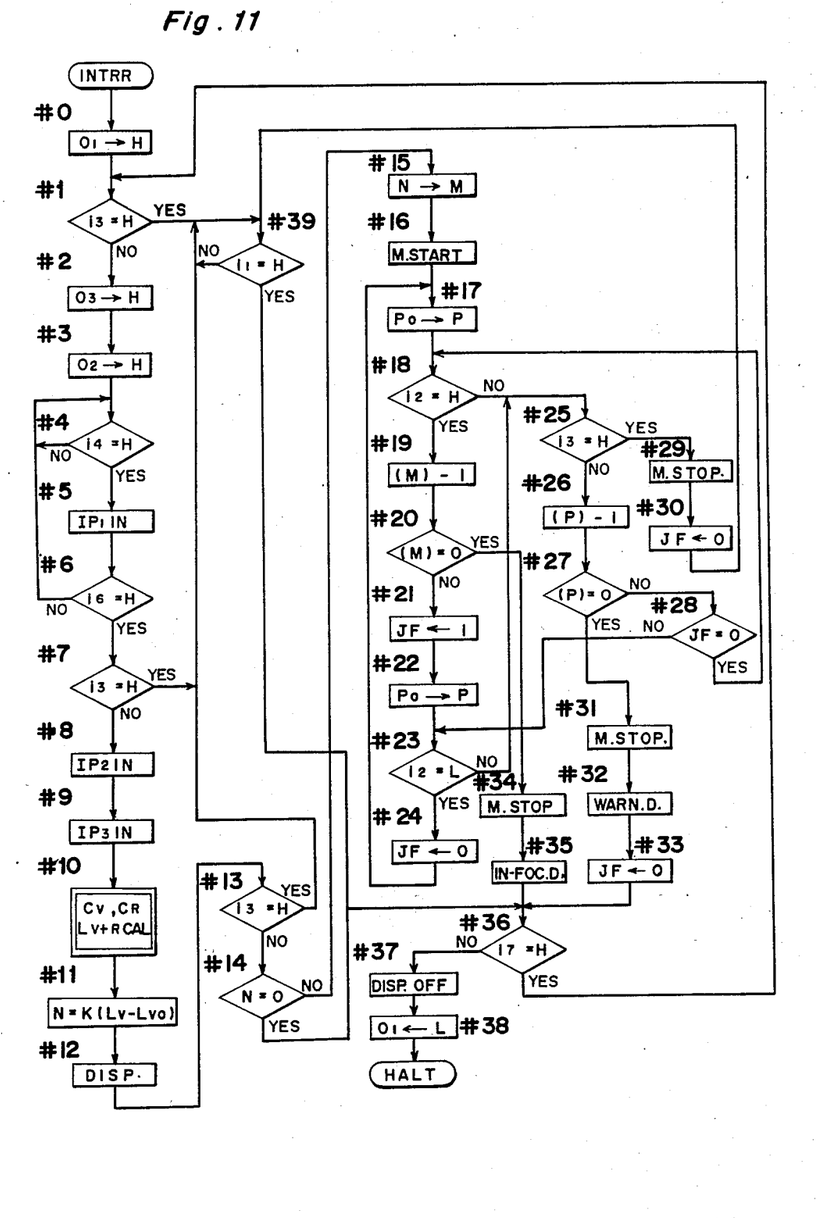
FIG. 11 is a flow-chart showing a focus condition detecting program by a micro-computer.

Subsequently, with reference to the flow-charts for the micro-computer MCO in FIGS. 11 and 12, operations of the circuits shown in FIGS. 9 and 10 will be described hereinbelow.

While the switch MS is in the opened state, the micro-computer MCO is in an inoperative state ("HALT" state), with small power consumption. Upon closure of the switch MS, the "High" output of the inverter $IN_2$ is applied to the interrupt terminal $i_t$ of the micro-computer MCO, which starts operation from step #0.

At step #0, the terminal $O_1$ becomes "High" and the output of the inverter $IN_3$ assumes "Low" state, thereby rendering the transistor $BT_3$ conductive, and thus, power supply by the power source line Vcc is started. At step #1, judgement is made as to whether or not the input terminal $i_3$ is in the "High" state due to closure of the switch RS, and if the input terminal $i_3$ is "High", the operation proceeds to step #39 to be described later for effecting the exposure control operation. Meanwhile, if the input terminal $i_3$ is of "Low", the micro-computer MCO generates a "High" pulse at step #2 from the output terminal $O_3$ to cause the controller COT to start the light measurement for the focus condition detection as described earlier, and furthermore, at step #3, generates a "High" pulse from the output terminal $O_2$ to cause the interface circuit to start the reading operation of the data $\Delta X_R$ and K from the lens data output circuit LDO (i.e., the portion 34 in FIG. 1) referred to earlier.

Subsequently, at step #4, the micro-computer MCO waits for the input terminal $i_4$ to assume "High" state, and when the terminal $i_4$ becomes "High", takes in the output data of the controller COT from the input port $IP_1$ (step #5) and thereafter judges as to whether or not the input terminal $i_6$ is "High" (step #6). If it is in "low" state, the operation returns to step #4 again and the next data are taken in. Meanwhile, if the input terminal $i_6$ is judged to be "High" at step #6, it is regarded that the taking-in of all output data of the controller COT corresponding to the A/D conversion values of the amounts of electrical charges accumulated by all of the picture elements of the CCD has been completed, and the operation proceeds to step #7. At step #7, it is checked whether or not the input terminal $i_3$ is "High", indicating the closure of the switch RS and if the terminal $i_3$ is "High", the operation proceeds to step #39.

If the input terminal $i_3$ is not of "High" at step #7, the operation proceeds to step #8, and the data for $\Delta X_R$ are taken in from the input port $IP_2$, and then, the data for K are taken in from the input port $IP_3$.

Figure 12:
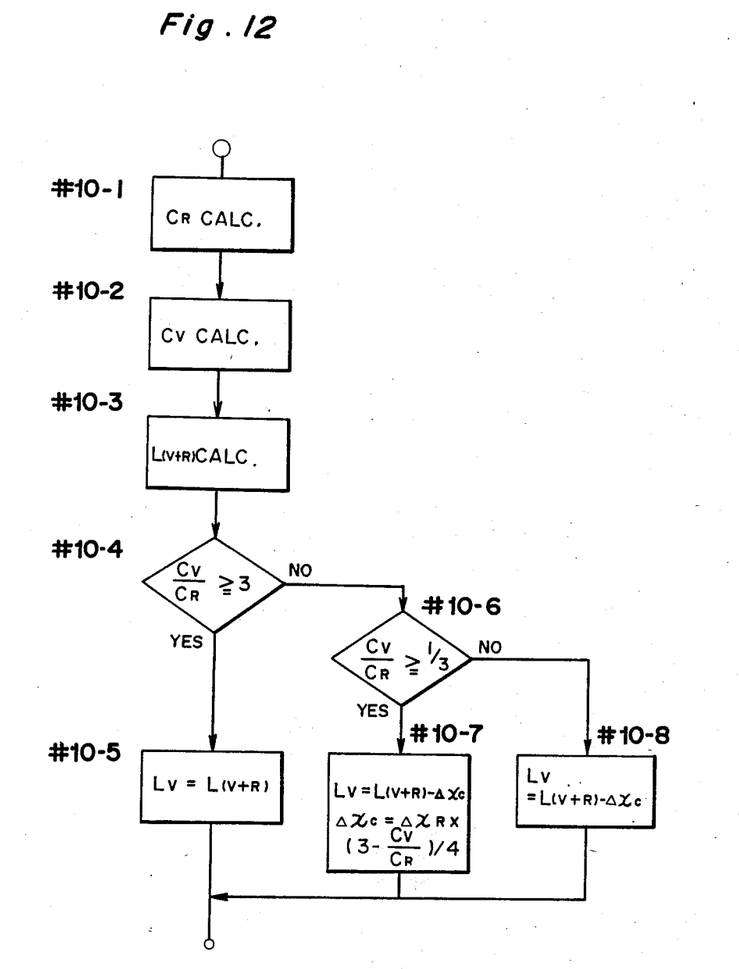

At steps #10 and #11, calculation of contrasts of the target object and calculation of deviation amount and direction of defocus are effected based on the data taken in from the input port $IP_1$ as shown in FIG. 12. More specifically, at steps #10-1 and #10-2, with respect to the contrast calculation, $$C_V = \sum_{n=1}^{M-1} |e_n - e_{n+1}| \text{ or } C_V = \sum_{n=1}^{M-1} (e_n - e_{n+1})^2$$

is worked out based on the data $e_n$ (n=1, ..., M) corresponding to the infrared light area 52R of the photo-sensor array 52, and also, $$C_R = \sum_{n=1}^{N-1} |e_n' - e_{n+1}'| \text{ or } C_R = \sum_{n=1}^{N-1} (e_n' - e_{n+1}')^2$$

is calculated based on the data $e_n'$ (n=1, ..., N) corresponding to the visible light area 52V of the photo-sensor array 52.

At step #10-3 in FIG. 12, with respect to the calculation for the focus condition detection, the image interval $L_{V+R}$ is calculated based on the algorithm disclosed, for example, in U.S. Pat. No. 4,333,007.

Moreover, at steps #10-4 to #10-8, selection of the correcting amounts is effected according to the ratio of $C_V$ to $C_R$ and the correction of the calculated image interval $L_{V+R}$ is effected in the manner as follows:
when $C_V/C_R \geq 3$, $L_V = L_{V+R}$, and
when $\frac{1}{3} < C_V/C_R < 3$, $L_V = L_{V+R} - \Delta X_C$,
where $\Delta X_C = \Delta X_R(3 - C_V/C_R)/4$, and
when $C_V/C_R \leq \frac{1}{3}$, $L_V = L_{V+R} - \Delta X_R$.

The conditions $C_V/C_R \geq 3$, $\frac{1}{3} < C_V/C_R < 3$, and $C_V/C_R \leq \frac{1}{3}$ are different from the conditions $h_V/h_R \geq 3$, $\frac{1}{3} < h_V/h_R < 3$, and $h_V/h_R \leq \frac{1}{3}$ referred to earlier as conditions for the ratio of the contrast of the target object with respect to the infrared light, to the contrast of the target object with respect to the visible light, but the above two conditions are not those entirely different from each other, but as a general trend, make it possible to effect a similar judgement.

Referring back to FIG. 11, at step #11, the calculation of $N = K(L_V - L_{V0})$ is effected based on the data K representing the ratio of the amount of drive of the lens driving mechanism LDR to the amount of drive of the objective lens so as to calculate the number of pulses N to be inputted from the encoder EN to achieve the focusing. Here, $L_{V0}$ represents the image interval between the image formed on the standard portion and reference portion by the visual light in the in-focus condition. At step #12, the detected focus condition is displayed, and the checking of the input terminal $i_3$ is effected in the similar manner as described earlier.

At step #14, it is judged whether or not the number of pulses N is 0. If N is 0, the operation proceeds to step #36 to be described later, while on the contrary, if N is not 0, the operation proceeds to step #15, and the number of pulses N is set in a register M within the micro-computer MCO. Then, the motor MO is started to rotate in the forward or reverse direction according to the direction of deviation of the focusing (step #16), and data $P_0$ is set in a register P within the micro-computer MCO (step #17). subsequently, judgement is made as to whether or not the input terminal $i_2$ has become "High" by input of a pulse from the encoder EN (step #18), and if the input terminal $i_2$ is "Low", the operation proceeds to step #25, while if it is "High", the operation proceeds to step #19.

At step #25, it is checked whether or not the input terminal $i_3$ is "High", with the switch RS closed, and if it is "High", the rotation of the motor is stopped (step #29) since the exposure control operation is about to start, and after resetting of a flag JF in the micro-computer to be described later (step #30), the operation proceeds to step #39. On the other hand, if the input terminal $i_3$ is "Low", "1" is subtracted from the content of the register P at step #26 to check whether or not the content of the register P is "0" (step #27). If the content of the register P is not "0", judgement is made at step #28 as to whether or not the flag JF is "0", and if it is "0", the operation returns to step #18 at which it is checked whether or not the input terminal $i_2$ is "High". If the input terminal $i_2$ is "Low", the operation is again proceeds to step #25. Accordingly, the steps as described above are repeated until the input terminal $i_2$ becomes "High", an if the input terminal $i_2$ does not assume "High" state before the content of the register P becomes 0 (i.e., during a predetermined period of time starting from the first checking of the input terminal $i_2$ at the step #18), the state is such that the lens driving mechanism can not move any further by some causes (e.g., the objective lens is located at the closest distance position) and therefore, rotation of the motor MO is stopped at step #31 and warning display is effected at step #32. Thereafter, the flag JF is reset and the operation proceeds to step #36.

At step #18, upon judgement that the input terminal $i_2$ is "High", "1" is subtracted from the content N of the register M at step #19 to see if the content of said register M has become "0" at step #20. If the content of the register M is not "0", "1" is set in the flag JF at step #21 and the data $P_0$ is set in the register P (step #22) and thereafter it is judged at step #23 whether or not the input terminal $i_2$ has become "Low". If the input terminal i₂ remains "High", the operation proceeds to step #25 referred to earlier so as to enter the flow for counting the predetermined period of time, and since the flag JF is "1" in this case, the operation returns to step #23. Meanwhile, if the content of the register P is "0" at step #27, it is regarded that the lens has been driven up to the closest distance position. Therefore, in this case the operation proceeds to the flow starting from step #31 to step #33 and further proceeds to step #36. Meanwhile, if it is judged at step #23 that the input terminal i₂ has become "Low", the flag JF is reset at step #24 to return to step #17.

In the above case, "1" is subtracted from the content of the register M only when it is judged that the input terminal i₂ has become "High". However, the arrangement may be so modified that "1" is subtracted from the content of the register M also when the input terminal i₂ has become "Low" to see if the content of the register M has become "0" at step #20. With this arrangement, if a value twice as large as that of the present embodiment is worked out for the value of N, accuracy for the lens focus adjustment is further improved, since positive edges and negative edges of the pulses from the encoder EN are counted in this case.

At step #20, if it is judged that the content of the register M is equal to "0", the objective lens is regarded to have been moved to the in-focus position, and the motor MO is stopped at step #34, with the display for the in-focus state at step #35.

At step #36, judgement is made as to whether or not an input terminal i₇ is "High" due to the closure of the switch MS. If the input terminal I₇ is "High", the operation returns to step #1 to repeat the similar function as described earlier, while, if the input terminal i₇ is "Low", the display is put off at step #37, and the output terminal O₁ is rendered to be "Low" to stop the power supply from the power source line Vcc by the transistor BT₂, with a result that the micro-computer MCO is brought into the state of "HALT". Meanwhile, in the case where the switch RS is closed, waiting is effected until the input terminal i₁ becomes "High" at step #39. Thus, upon completion of the exposure control operation, a pulse in "High" state is applied to the input terminal i₁ from the exposure control circuit EC, whereby the operation proceeds to step #36.

As is seen from the foregoing description, according to the present invention, a focus condition detecting arrangement of the type employing photo-sensor arrays having sensitivities both for the infrared light and visible light is so arranged to correct a focus condition detection signal obtained by the output of said photo-sensor arrays, through employment of contrast in the respective wavelength regions for only the infrared light and visible light, and therefore, accurate correction may be effected even with respect to a target object having a high contrast but dark in the visible light region, or a target object having a low contrast, but bright in the infrared light region.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A focus condition detecting arrangement for use in a photographic camera, which comprises a focus condition detecting device including photo-sensor means having sensitivity with respect to a visible light and an infrared light from a target object to be photographed and adapted to produce a focus condition detection signal based on the output of the photo-sensor means, a contrast detecting means for detecting contrast of said target object with respect to the respective lights, and a correcting means for correcting the focus condition detection signal based on an output of said contrast detecting means, so that a corrected focus condition detection signal representing the focus condition with respect to the visible light is obtained.

2. A focus condition detecting arrangement as claimed in claim 1, wherein said correcting means is adapted to effect the correction of the focus condition detection signal in accordance with a signal representing chromatic aberration of an objective lens of said photographic camera and the output of said contrast detecting means.

3. A focus condition detecting arrangement as claimed in claim 1, wherein the amount of correction of correcting said focus condition detection signal is divided into a plurality of values.

4. A focus condition detecting arrangement as claimed in claim 1, wherein the output of said contrast detecting means represents is a ratio of the contrast of the target object with respect to the visible light to the contrast thereof with respect to the infrared light.

5. A focus condition detecting arrangement as claimed in claim 1, wherein the correcting amount $\Delta X_C$ for the focus condition detection signal is set as follows:

$$\Delta X_C = 0$$

when
$$C_V/C_R \geq 3,$$

$$\Delta X_C = \Delta X_R(3 - C_V/C_R)/4$$

when
$$\tfrac{1}{3} < C_V/C_R < 3, \text{ and}$$

$$\Delta X_C = \Delta X_R$$

when
$$C_V/C_R \leq \tfrac{1}{3}$$

wherein $C_V$ and $C_R$ represent contrasts of the target object with respect to the visible light and the infrared light, respectively.

* * * * *